United States Patent
Haddon et al.

(10) Patent No.: US 7,555,161 B2
(45) Date of Patent: Jun. 30, 2009

(54) IMAGE ANALYSIS

(75) Inventors: John Francis Haddon, Farnborough (GB); Sharon Katrina Watson, Farnborough (GB)

(73) Assignee: Qinetiq Limited (GB)

( * ) Notice: Subject to any disclaimer, the term of this patent is extended or adjusted under 35 U.S.C. 154(b) by 705 days.

(21) Appl. No.: 10/533,204

(22) PCT Filed: Nov. 10, 2003

(86) PCT No.: PCT/GB03/04841

§ 371 (c)(1),
(2), (4) Date: Apr. 28, 2005

(87) PCT Pub. No.: WO2004/044845

PCT Pub. Date: May 27, 2004

(65) Prior Publication Data

US 2006/0002608 A1   Jan. 5, 2006

(30) Foreign Application Priority Data

Nov. 12, 2002 (GB) .................................. 0226331.7

(51) Int. Cl.
*G06K 9/34* (2006.01)
(52) U.S. Cl. ........................ 382/173; 381/168; 381/171
(58) Field of Classification Search ................. 382/173, 382/111, 154, 236, 245, 168, 171; 356/238.2, 356/430; 358/1.9, 448, 426.09; 348/500, 348/512; 713/186; 715/723; 726/19; 324/306, 324/309; 386/54, 128

See application file for complete search history.

(56) References Cited

U.S. PATENT DOCUMENTS 5,204,625 A * 4/1993 Cline et al. .................. 324/306

(Continued)

OTHER PUBLICATIONS

Haddon et al., "Autonomous Segmentation and Neural Network Texture Classification of IR Image Sequences", IEEE, Feb. 1996, pp. 1-6.*

(Continued)

*Primary Examiner*—Anh Hong Do
(74) *Attorney, Agent, or Firm*—McDonnell Boehnen Hulbert & Berghoff LLP

(57) ABSTRACT

A method for the automated analysis of digital images, particularly for the purpose of assessing the presence and severity of cancer in breast tissue based on the relative proportions of tubule formations and epithelial cells identified in digital images of histological slides. The method includes the step of generating a property co-occurrence matrix (PCM) from some or all of the pixels in the image, using the properties of local mean and local standard deviation of intensity in neighbourhoods of the selected pixels, and segmenting the image by labelling the selected pixels as belonging to specified classes based upon analysis of the PCM. In this way relatively dark and substantially textured regions representing epithelial cells in the image can be distinguished from lighter and more uniform background regions Other steps include identifying groups of pixels representing duct cells in the image based on intensity, shape and size criteria, dilating those pixels into surrounding groups labelled as epithelial cells by a dimension to correspond to an overall tubule formation, and calculating a metric based on the ratio of the number of duct pixels after such dilation to the total number of duct and epithelial pixels. Other uses for the method could include the analysis of mineral samples containing certain types of crystal formations.

19 Claims, 9 Drawing Sheets

U.S. PATENT DOCUMENTS

| | | | | |
|---|---|---|---|---|
| 6,031,930 | A | | 2/2000 | Bacus et al. ................. 382/133 |
| 6,055,330 | A | * | 4/2000 | Eleftheriadis et al. ....... 382/154 |
| 6,134,354 | A | | 10/2000 | Bannister et al. ............ 382/270 |
| 6,804,381 | B2 | * | 10/2004 | Pang et al. .................. 382/111 |

OTHER PUBLICATIONS

Gupta et al., "The use of Texture Analysis to Identify Suspicious Masses in Mammography", Texture Analysis in Mammography, pp. 835-855 (1995).

Clausi, "An analysis of co-occurrence texture statistics as a function of grey level quantization", Canadian Journal of Remote Sensing, pp. 45-62 (2002).

Tan, "Texture feature extraction via visual cortical channel modelling", IEEE, pp. 607-610 (1992).

Perez et al., "Unsupervised segmentation based on robust estimation and cooccurence data", IEEE, pp. 943-945 (1996).

Haddon et al, "Co-ocurrence matrices for image analysis", Electronics and Communication Engineering Journal, pp. 71-83 (1993).

Schachter, et al., "Some experiments in image segmentation by clustering of local feature values", Pattern Recognition, pp. 19-28 (1979).

Haralick, "Computer and Robot Visiion I", Addison-Weslex Publishing Co., chaptuer 9.2., 9.3.

Khotanzad et al., "A Parallel, Non-Parametric, Non-Iterative Clustering Algorithm With Application to Image Segmentation", IEEE, pp. 305-309 (1988).

* cited by examiner

| a | b | c |
|---|---|---|
| d | X | e |
| f | g | h |

IMAGE ANALYSIS

FIELD OF THE INVENTION

The present invention relates to the automated analysis of digital images. It is more particularly concerned with the automated identification of different cell groupings in digital images of histological or cytology specimens and most particularly for the purpose of assessing the presence and severity of cancer in breast tissue based on the relative proportions of tubule formations and epithelial cells identified in digital images of tissue sections, and it is in this context that the invention is principally described herein. The invention may, however, also find application in the analysis of various other kinds of structure presenting image components which are amenable to identification in a similar way, for example in the analysis of mineral samples containing certain types of crystal formations.

BACKGROUND AND SUMMARY OF THE INVENTION

Many thousands of women die needlessly each year from breast cancer, a cancer from which there is theoretically a high probability of survival if detected sufficiently early. If the presence of cancerous tissue is missed in a sample, then, by the time the next test is undertaken, the cancer may have progressed and the chance of survival significantly reduced. The importance of detecting cancerous tissue in the samples can therefore not be over-emphasised.

A typical national breast screening programme uses mammography for the early detection of impalpable lesions. Once a lesion indicative of breast cancer is detected, then tissue samples are taken and examined by a trained histopathologist to establish a diagnosis and prognosis. This is a time consuming, labour intensive and expensive process. Qualification to perform such examination is not easy to obtain and requires frequent review. The examination itself requires the interpretation of colour images by eye, a highly subjective process characterised by considerable variations in both inter, and intra-observer analysis, ie. variances in observation may occur for the same sample by different histopathologists, and by the same histopathologist at different times. For example, studies have shown that two different histopathologists examining the same ten samples may give different opinions on three of them, an error of 30%. This problem is exacerbated by the complexity of some samples, especially in marginal cases where there may not be a definitive conclusion. If sufficient trained staff are not available this impacts upon pressures to complete the analysis, potentially leading to erroneous assessments and delays in diagnosis.

These problems mean that there are practical limitations on the extent and effectiveness of screening for breast cancer with the consequence that some women are not being correctly identified as having the disease and, on some occasions, this failure may result in premature death. Conversely, others are being incorrectly diagnosed with breast cancer and are therefore undergoing potentially traumatic treatment unnecessarily.

It is thus an aim of the invention to provide a method of image analysis which can be embodied in a robust, objective and cost-effective tool to assist in the diagnosis and prognosis of breast cancer, although as previously indicated the invention may also find application in other fields.

To aid in the understanding of this aim reference is made to the accompanying FIG. 1 which is a simplified representation of the kinds of objects which typically appear in a histological slide of breast tissue. Tubule formations are present comprising ducts such as indicated at 1 surrounded by epithelial layers 2. The ducts appear as small, bright regions of various shapes while the epithelial cells appear substantially more textured and darker. Fat cells such as indicated at 3 appear of similar intensity to the ducts 1 but are generally substantially larger. Elongate regions of similar intensity to the ducts 1 and fat cells 3 may also be present, such as indicated at 4, and are characteristic of tears in the tissue or cracks due to shrinkage. The remainder of the slide comprises "background" tissue 5 which generally appears darker than the ducts 1, fat cells 3 and tears/cracks 4 but lighter and more uniform in texture than the epithelial cells 2. Healthy tissue should contain a significant number of tubule formations comprising ducts usually having a boundary of two epithelial cells. In cancerous tissue the tubules tend to break down and epithelial cells proliferate so the area ratio between these structures in any given sample can be used as an indication of the presence and severity of cancer. More particularly, histopathologists conventionally make a subjective assessment of a metric M, given by:

$$M = \frac{T}{D+E} \quad (1)$$

where T is the surface area in the slide covered by tubule formations (the ducts plus boundary of two epithelial cells), D is the surface area covered by ducts and E is the surface area covered by all epithelial cells (including those in T), and relate their assessment of the value of this metric to a grade of cancer using thresholds typically as follows:

TABLE 1

Histopathologist thresholds for cancer severity

| Metric value | Cancer grade |
|---|---|
| ≧75% | Grade 1 |
| ≧10%, <75% | Grade 2 |
| <10% | Grade 3 | where Grade 1 is the least serious and Grade 3 is the most serious.

If an objective assessment of the same or a similar metric is to be achieved through an automated method of image analysis it is necessary to distinguish inter alia those objects in an image which comprise epithelial cells and in one aspect the invention accordingly resides in a method for the automated analysis of a digital image comprising an array of pixels which includes the steps of: generating a property co-occurrence matrix (PCM) from some or all of said pixels, using the properties of local mean and local standard deviation of intensity in neighbourhoods of the selected pixels; and segmenting the image by labelling the selected pixels as belonging to specified classes consequent upon analysis of said PCM.

The invention also resides in apparatus for the automated analysis of a digital image comprising means to perform the foregoing method and in a computer program product comprising a computer readable medium having thereon computer program code means adapted to cause a computer to execute the foregoing method and in a computer program comprising instructions so to do.

Property co-occurrence matrices (PCMs) are described e.g. in Electronics and Communication Engineering Journal, pp 71-83, Vol 5, No 2, 1993 (*Co-occurrence Matrices for Image Analysis*, J F Haddon and J F Boyce), and are an extension or generalisation to the standard grey level co-occurrence matrices described e.g. in IEEE Trans. Syst., Man, Cybern., Vol SMC-3, pp 610-621, 1973 (*Texture Features for Image Classification*, R M Haralick, K Shanmugan and I Dinstein). They are multidimensional histograms in which each element is the frequency with which selected properties co-occur. By generating a PCM using the properties of local mean and local standard deviation of intensity in neighbourhoods of image pixels, analysis of such a PCM can thus distinguish pixels contributing to regions of, say, relatively low local mean and relatively high local standard deviation (such as the dark, textured regions representing epithelial cells in the preferred implementation of this aspect of the invention) and pixels contributing to regions of, say, relatively high local mean and relatively low local standard deviation (such as the lighter, more uniform regions representing "background" tissue in the preferred implementation of this aspect of this invention), or to regions of other combinations of those properties in other applications of the invention.

These and other aspects of the invention will now be more particularly described, by way of example, with reference to the accompanying drawings and in the context of an automated system for grading cancer on the basis of tubule formations in digital images of histological slides of potential carcinomas of the breast.

DETAILED DESCRIPTION

General System Configuration

Figure 1:
FIG. 1 is a simplified representation of typical objects in a histological slide of breast tissue, which may be analysed in accordance with the preferred embodiment of the invention.
Figure 2:
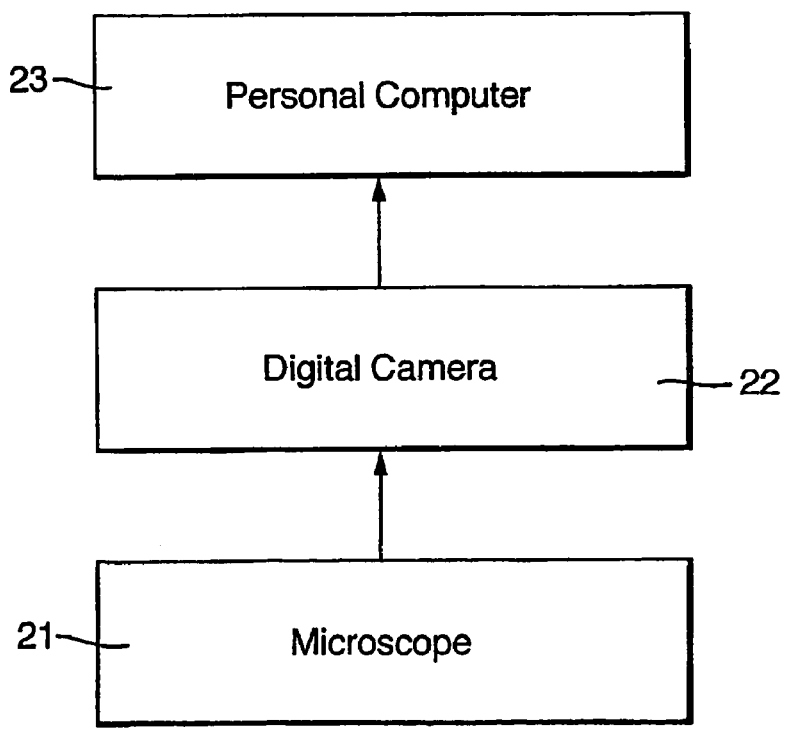
FIG. 2 is a block diagram of the equipment in the preferred embodiment for obtaining and analysing digitised images.

FIG. 2 shows a typical computer based system for image capture and processing for implementing the present invention. Sections are cut from breast tissue samples, placed on slides and stained in accordance with conventional techniques. A pathologist scans the slides in a microscope 21, selects regions which appear to be most promising in terms of the analysis to be performed, and they are photographed with a digital camera 22. Images from the camera 22 are downloaded to a personal computer (PC) 23 where they are stored and processed as described below. In a system utilised by the inventors, the microscope provided optical magnification of 10× and the digital images were 1476 pixels across by 1160 down. Other magnifications and digitised sizes can be used without compromising the algorithm more particularly described below provided that some system parameters such as cell size, the maximum bridged gap in dilation and shape criteria are adjusted accordingly. The microscope and camera could be replaced by other suitable equipment, such as a high resolution flatbed scanner or similar. Automated devices could replace the microscope/digitiser combination. The PC could also be replaced with any general computer of suitable processing power or by dedicated hardware. The techniques described herein can be applied to digital imagery irrespective of how the data is obtained.

Overview of Process

Figure 3:
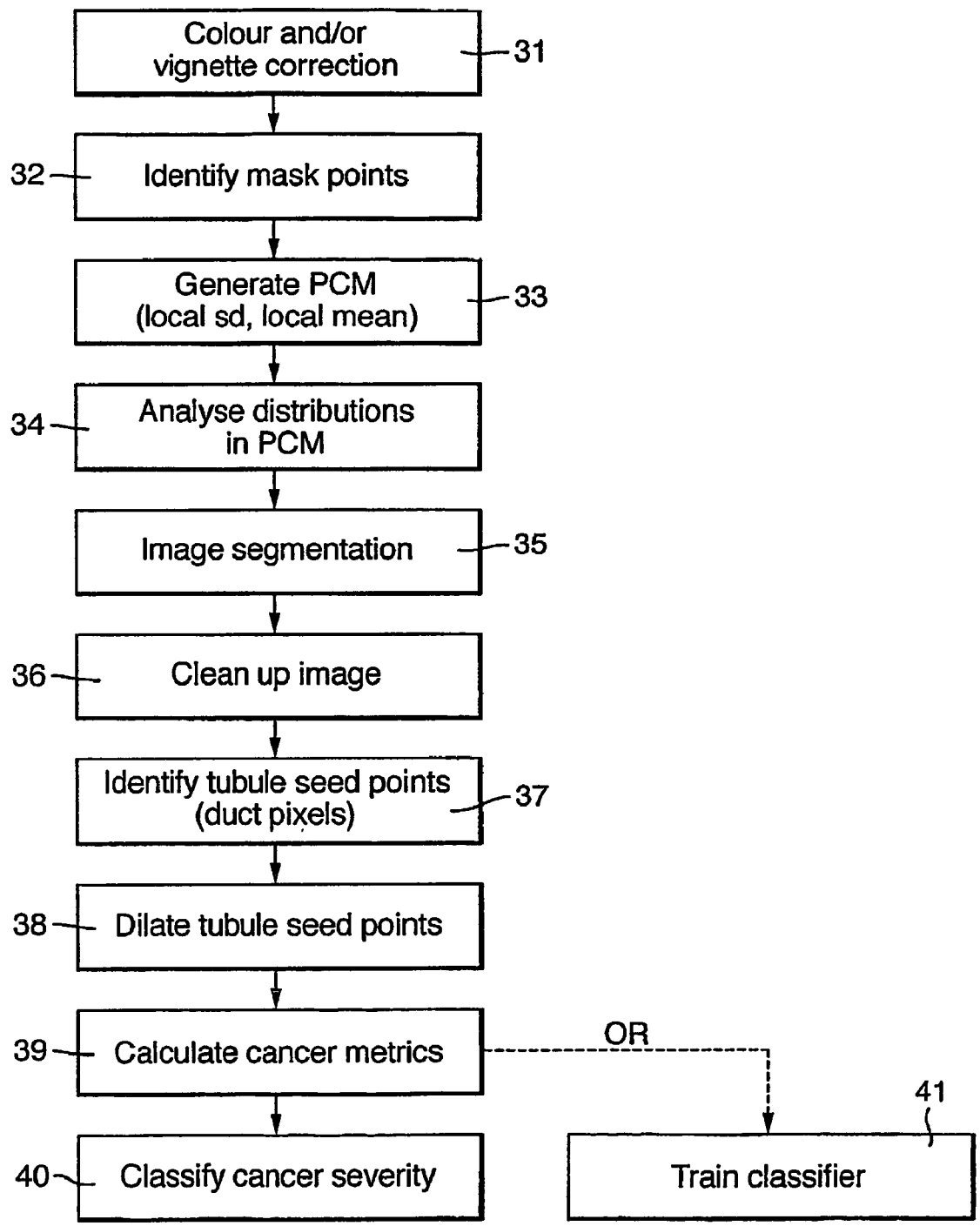
FIG. 3 shows the layout and process flow of the main algorithmic components in the preferred embodiment.

FIG. 3 shows an outline of the processing components in the preferred embodiment of the invention and these will be discussed individually in greater detail in subsequent sections. Briefly, however, the process proceeds as follows.

The first step 31, following initial digitisation, is to correct the colour balance and vignetting of the image, if required. In step 32 mask points are identified to exclude certain pixels (which are neither parts of epithelial cells nor "background" tissue) from the generation at step 33 of a PCM based on local standard deviation and local mean of intensity values. The PCM distributions are analysed at step 34 to distinguish pixels contributing to epithelial cells and "background" tissue respectively, and the image is segmented at step 35 by labelling pixels as epithelial or background (from step 34) or masked (from step 32). Contiguous pixels having the same label are grouped into blobs and filtered to clean up the image at step 36 (or in the case of masked pixels will have been grouped and filtered at step 32). Blobs of pixels labelled masked which have shape and size characteristics indicative of ducts are identified and relabelled accordingly at step 37. The resultant duct blobs are then dilated at step 38 into adjoining blobs labelled epithelial, by an amount corresponding to two epithelial cells, so that they now cover an area corresponding to that of a tubule formation. A metric is calculated at step 39 based on the area ratio of dilated duct pixels to the total of duct and epithelial pixels and transformed to an indication of cancer severity at step 40 and/or used to train a classifier at step 41.

Digitisation and Calibration

Figure 4:
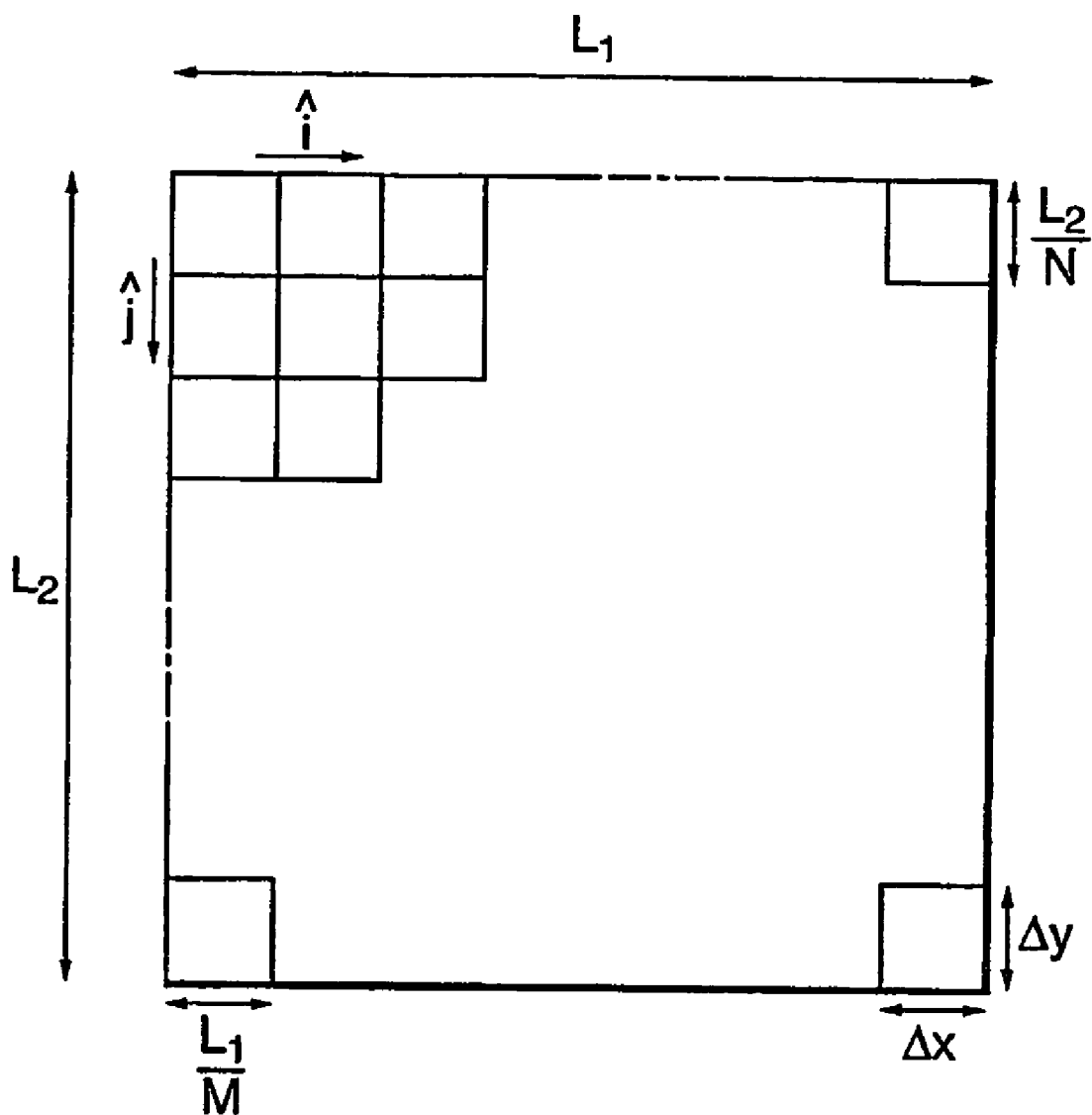
FIG. 4 is a schematic diagram of pixels in an image.

The combination of microscope 21, camera 22 and computer 23 shown in FIG. 2 provides a digital image of physical size $L_1$ by $L_2$ and resolution N by M elements of pixels as shown in FIG. 4. Each pixel is therefore of physical dimension $\Delta x$ by $\Delta y$, or $L_1/M$ by $L_2/M$. Each pixel will have an address (x,y) in the image, which will generally be represented by the vector x. Each pixel has a grey level intensity I or a tuple of colours associated with it. In the preferred embodiment and in the equipment which has been used in development of the invention, each pixel has a red, green and blue intensity associated with it, $(I_r, I_g, I_b,)$ and is square.

In step 31, a calibration image is captured using a clear portion of the slide. The intensity of the lighting associated with the microscope is increased until the maximum intensity of a few pixels in one or more wavebands (red, green or blue) is at or close to saturation. As few pixels as possible should be saturated but would typically be around 1%. Any lens system causes variations such as vignetting in an image and this impacts upon uniformity of intensity across an image. If these variations are severe then they may need to be corrected prior to the application of any image processing algorithm. In the equipment which has been used the vignetting effect caused a variation in intensity of up to 10% between the middle and corners of the image. This may impact upon the efficacy of the algorithm and is preferably corrected.

In the preferred embodiment, the image vignetting is roughly corrected by scaling the colour component at a pixel x by a factor F, where $$F_k(x) = S \frac{I_k(x) C_k(x)}{\max_x C_k(x)} \quad (2)$$

where S is a scale factor. In the preferred embodiment, S=0.95. The subscript k refers to the waveband; red, green, blue or grey or as appropriate. $C_k$ is the $k^{th}$ waveband of the calibration image and the function $$\max_x$$

means the maximum value over index x. In the above example this process meant that the image became consistent to significantly less than 5%. However, the region to be analysed can be further constrained if desired by imposing an elliptical mask on the image such that the axes of the ellipse are 95% of the image dimensions. This further helps to ensure that the image intensity is sufficiently consistent in the area to be analysed.

The colour balance should also be consistent and reproducible between different digitisations. This may become critical if a combination of the red, green and blue wavebands is used, such as in a grey level image. Colour balance correction can be obtained by assuming that the maximum grey level intensity in the calibration image corresponds to peak white and forcing the red; green and blue components to be of equal and maximum intensity. The red, green and blue components of any pixel can then be linearly scaled accordingly. It is also possible to use an average from several pixels that it is believed should be peak white:

$$I_{gr}(x) = \frac{I_r(x) + I_g(x) + I_b(x)}{3} \quad (3)$$

$$I_{r'}(x) = I_r(x) \frac{S_c}{I_{rw}} \quad (4)$$

$$I_{g'}(x) = I_g(x) \frac{S_c}{I_{gw}}$$

$$I_{b'}(x) = I_b(x) \frac{S_c}{I_{bw}}$$

where $I_{gr}$ is the grey level image formed from the red, green and blue components.

$I_{rw}, I_{gw}, I_{bw}$ are the red, green and blue components corresponding to the pixel (or the average of those corresponding to the pixels) that should be peak white.

$S_e$ is a scaling factor which determines the actual peak white intensity; this would typically be 255.

This process assumes that peak black corresponds to (0,0,0) and does not need to be corrected. A minor change to Equation (4) would enable this to be taken into account. By applying the colour and vignette correction to the digitised image to be analysed then the resultant image has sufficient uniformity to be amenable to the following analysis. If an image can be obtained without significant variation of intensity then the calibration may not be needed.

The following processing steps can operate on a single waveband image that could be the red, green or blue component, or some combination of them such as a grey level image formed from the average of the colour components. In practice the red waveband has been found to contain the most information for discriminating between relevant portions of the image when using conventional staining.

Generating a Property Co-occurrence Matrix

Property co-occurrence matrices (PCM) are fundamental to this algorithm. As previously indicated, they are an extension or generalisation to the standard grey level co-occurrence matrices defined by Haralick et al. PCMs are multidimensional histograms in which each element is the frequency with which the particular properties have co-occurred in an image. Formally, a PCM S can defined as:

$$S(l_1, l_2, \ldots, l_K) = \sum_x \delta(l_1; P_1(x)) \delta(l_2; P_2(x)) \ldots \delta(l_K; P_K(x)) \quad (5)$$

$$= \sum_x \prod_{k=1,K} \delta(l_k; P_k(x))$$

where $P_k$ is the $k^{th}$ property at pixel x $\delta$ is the Kronecker delta function such that $$\delta(i; j) = \begin{cases} 1 & \text{if } i = j \\ 0 & \text{otherwise} \end{cases}$$

In the preferred embodiment, the PCM generated at step 33 is 2-dimensional and the two properties used are local mean and local standard deviation of intensity calculated over a neighbourhood $\Delta_m$ and $\Delta_o$ respectively. These neighbourhoods are based upon the size of epithelial cells. The larger the neighbourhood, the poorer the localisation of the boundaries but the more accurate the estimate of local mean and standard deviation. In the preferred embodiment a compromise has been reached where typical values of $\Delta_m$ and $\Delta_\sigma$ are 7 and 13 respectively. A typical epithelial cell was of the order of 13 pixels across for the magnification used in this case.

A mask component M has been introduced to the formation of co-occurrence matrices so that $$S(l_1, l_2, \ldots, l_K) = \sum_x \delta(1; M(x)) \prod_{k=1,K} \delta(l_k; P_k(x)) \quad (6)$$

where $$M = \begin{cases} 1 & \text{if pixel to be included} \\ 0 & \text{otherwise} \end{cases} \quad (7)$$

The properties used in the preferred embodiment are local mean and local standard deviation calculated in a standard way but masking out pixels that are to be excluded, namely:

$$P_1(x) = M(x) \frac{\sum_{v=\Delta_m} M(v)I(v)}{\sum_{v=\Delta_m} M(v)} \quad (8)$$

$$P_2(x) = M(x) \sqrt{\frac{\sum_{v=\Delta_a} M(v) \sum_{v=\Delta_a} M(v)I(v)^2 - \left(\sum_{v=\Delta_{a'}} M(v)I(v)\right)^2}{\sum_{v=\Delta_a} M(v)\left(\sum_{v=\Delta_{a'}} M(v) - 1\right)}} \quad (9)$$

If the pixel x is to be omitted then the value of $P_1$ and $P_2$ are zero, but are already excluded from the formation of the PCM. If the results of either equation (8) or (9) are undefined (such as from a divide by 0) then the results are excluded from the formation of the PCM. This has not been explicitly stated in equation (7).

Identification of Mask Points

The PCM in step 33 can be formed from all pixels in the image to be analysed. However, pixels from areas that are known to be of no interest will cause an increase in the complexity of the matrix and reduce the difference between parts of the matrix which are of interest. Accordingly, in the preferred embodiment; certain pixels are excluded from the formation of the PCM using a masking operation as defined in equation (7) and are identified in step 32. Pixels to be excluded are those that:

Are not part of tissue, ie. outside the sample or parts of tears or gaps caused by shrinkage.

Are part of fat tissue.

Are part of ducts.

Where the mask is such that there are no pixels with which to calculate the local mean, or 1 or less with which to calculate the local standard deviation.

Figure 5:
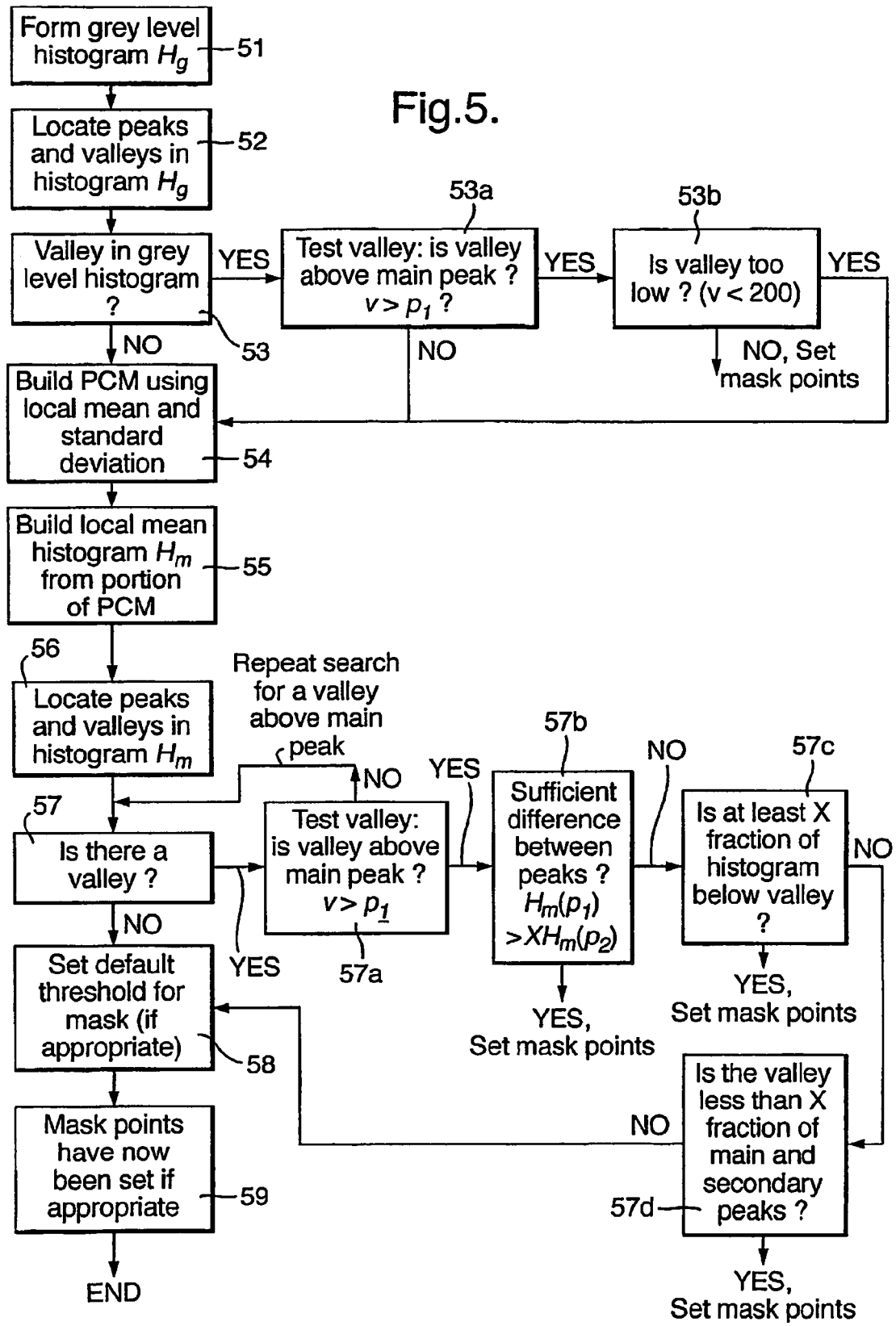
FIG. 5 shows the process for the determination of mask points in the preferred embodiment.
Figure 6A:
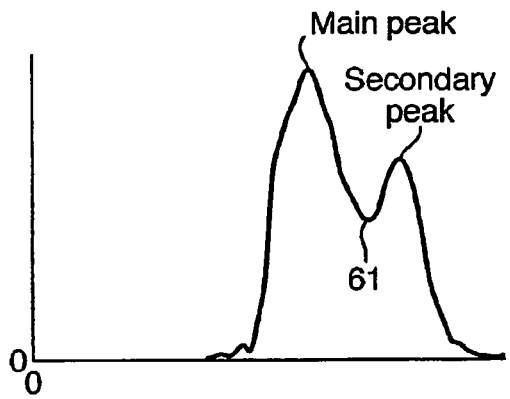
FIG. 6(*a*) shows a valley between two peaks in a histogram while in FIG. 6(*b*) there is no valley.

Any algorithm that identifies these pixels could be used. However, in the preferred embodiment the algorithm shown in FIG. 5 is used. The pixels to be omitted are characterised as being near to saturation (compared to other data on the slide) and to have a very low local standard deviation. If there are a significant number of pixels to be omitted then there may be a valley in a grey level histogram $H_g$ formed from all the pixels in the image, such as shown at 61 in FIG. 6(a):

$$H_g(i) = \sum_x \delta(i; I(x)) \quad (10)$$

Figure 6B:
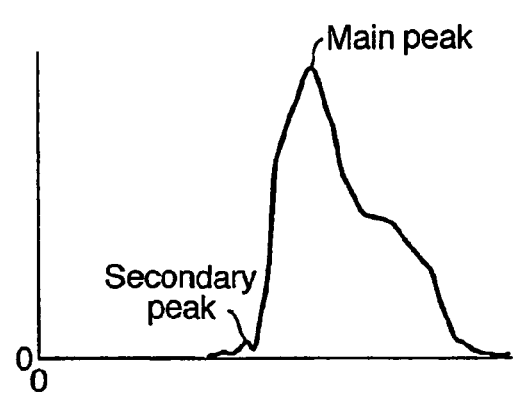
Figure 7:
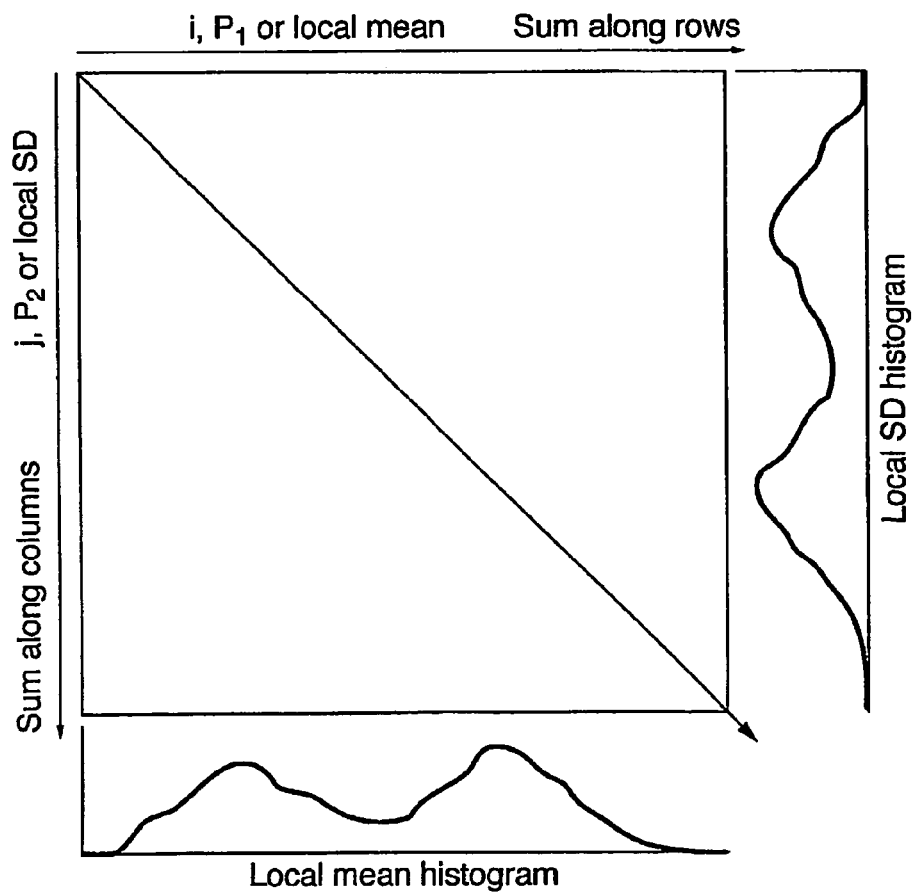
FIG. 7 is a diagram showing different labels for the axes of a PCM, and the marginal distributions.
Figure 8:
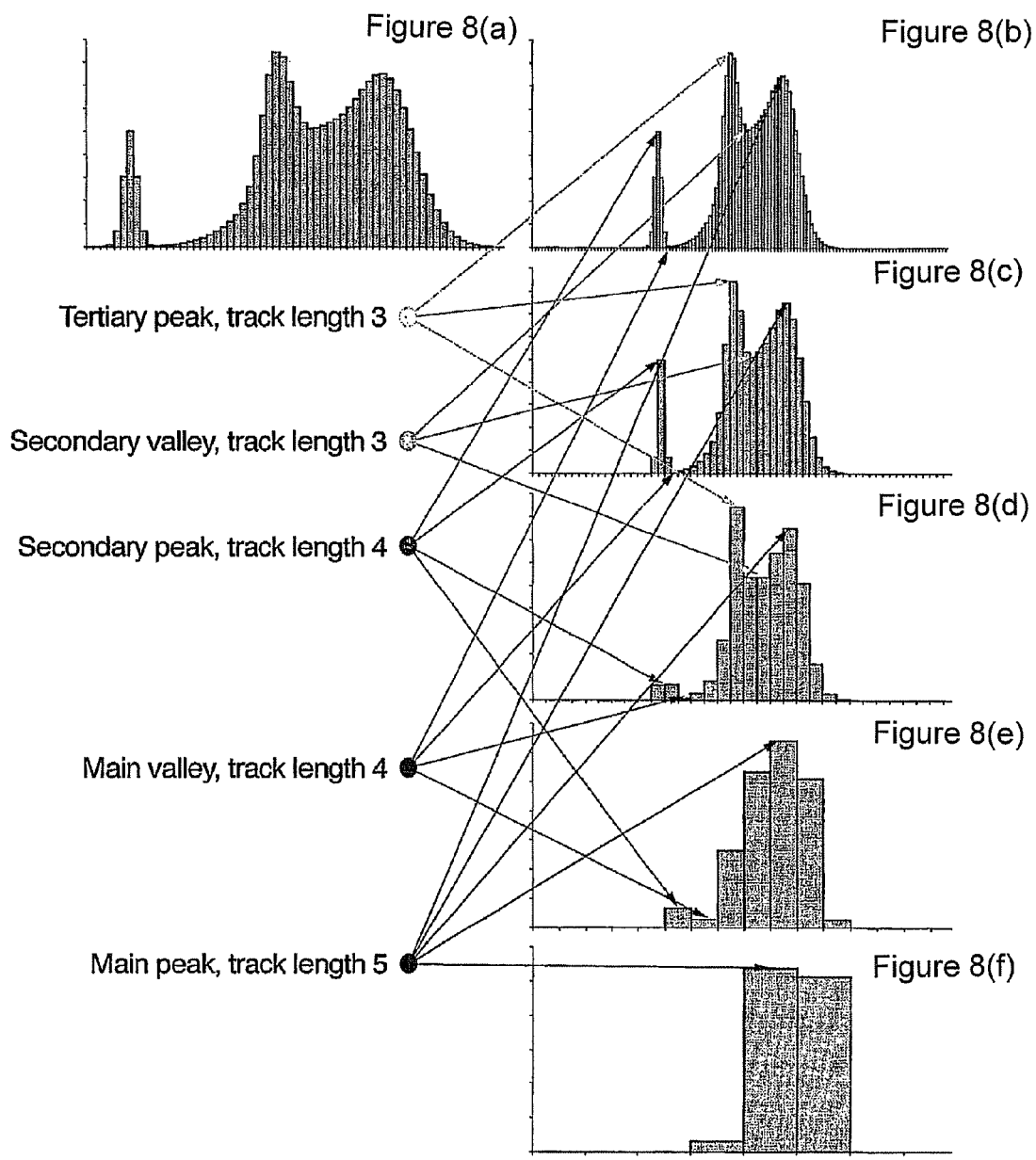
FIG. 8(*a*) shows an original histogram while FIG. 8(*b*) shows this zero extended on both sides and FIGS. 8(*c*)-(*f*) show the same histogram at progressively larger scales by averaging over 2, 4, 8 and 16 bins; the location of all peaks and valley are shown for each resolution, as is the track length associated with the particular peak or valley.

If there is no appropriate valley at which to set a threshold, such as in FIG. 6(b), then a PCM is formed from the local mean and local standard deviation. This is distinct from, and has a higher resolution than, the PCM formed in the subsequent step 33. Because the local mean is calculated from a neighbourhood and therefore has non-integer values it is possible to increase the resolution of the matrix. For instance, if a neighbourhood of 9 pixels is used then the resolution could be increased by a factor of 9. In practice, the increase would not generally be this large. A local mean histogram $H_m$ is formed from summing the PCM parallel to the standard deviation axes for low local standard deviation (see FIG. 7):

$$H_m(i) = \sum_j S(i, j) \quad (11)$$

where the i index in the PCM is local mean and the j index local standard deviation. The histogram $H_m$ is constrained to be between the lower of the main and secondary peaks as determined from an analysis of the histogram, as discussed hereinafter.

The block diagram of the process in the preferred embodiment of setting the mask pixels is shown in FIG. 5 and is described below. The key objective is to find an appropriate threshold in either the grey level histogram, or the local mean histogram, such that duct cells, fat and tissue tears can be omitted from the formation and analysis of the subsequent PCM in step 33. If a simple threshold cannot be found, then one based on a more complex set of criteria is used. It may not always be possible, or desirable, to have a threshold, in which case no threshold operation is used and no pixels are excluded from the subsequent PCM analysis.

| Step | Operation/test | Actions |
| --- | --- | --- |
| 51 | Form histogram $H_g$ | |
| 52 | Identify location of peaks and valleys in $H_g$<br>v = position of main valley<br>$p_1$, $p_2$ = position of main and secondary peaks,<br>$H_g(p_1) > H_g(p_2)$ | |
| 53 | Is there a valley in the histogram? | NO: GOTO step 54<br>YES: |
| 53a | Test valley. Is it above the main peak?<br>$v > p_1$? | NO: GOTO step 54<br>YES: |
| 53b | Is valley too low?<br>v < 200? | NO: use valley as threshold to set the mask points.<br>GOTO step 59<br>YES: GOTO step 54 |
| 54 | Build PCM using local mean and standard deviation. | |
| 55 | Build local mean histogram $H_m$ from a portion of the PCM | |
| 56 | Identify location of peaks and valleys in $H_m$<br>v = position of main valley<br>$p_1$, $p_2$ = position of main and secondary peaks,<br>$H_m(p_1) > H_m(p_2)$ | |

-continued

| Step | Operation/test | Actions |
|---|---|---|
| 57 | Is there a valley in the histogram? | NO: GOTO step 58 to set default threshold. YES: |
| 57a | Test valley. Is it above the main peak? $\mu > p_1$? | NO: Search for another valley in the histogram which is above the main peak. If no valley can be found then GOTO step 58. YES: |
| 57b | Is the amplitude of the main peak greater than X% of the secondary peak (which is above the valley being examined). $H_m(p_1) > XH_m(p_2)$ To reduce sensitivity to noise, the peak amplitude is assessed by including a component from neighbouring elements in the matrix. This would typically be done by convolving with [1 2 1] or larger operator. X is typically 150% | YES: use valley as threshold to identify points to be included in mask. GOTO step 59. |
| 57c | Is at least X fraction of the histogram $H_m$ below the valley being examined? X is typically 75% $$\frac{\sum_{j=0}^{v-1} H_m(j)}{\sum_j H_m(j)} > X$$ | NO: YES: use valley as threshold to identify points to be included in mask. GOTO step 9. NO: |
| 57d | Is the valley less than X fraction average of the main and secondary peak amplitudes? X is typically 80% | YES: use valley as threshold to identify points to be included in mask. GOTO step 59. NO: GOTO step 58 |
| 58 | If all tests have failed then either there are no mask points to be set, or the number is very small. Use a fallback threshold in $H_m$ set at X fraction of the distance from the main peak to the maximum intensity in the image. This may mean that there are no mask points to be set. X is typically 0.75 | |
| 59 | END | |

Any appropriate algorithm could be used for determining the location and relative importance of peaks and valleys in the histogram $H_g$ or $H_m$. However, in the preferred embodiment the following algorithm is used.

Peaks and valleys in the histogram are determined using a multi-resolution approach which determines both peak and valley locations and a metric (track length) that is related to the 'importance' of the peak. A small isolated peak is considered to be of equal importance to a large peak.

The histogram is zero-extended so that it runs from $-2^{n/2}$ to $2^{3n/2}$, where n is determined such that $2^n$ is the smallest number of bins completely containing the histogram before zero extension. This is achieved by first extending the histogram until its number of bins is equal to $2^n$ and setting the new bins to zero, and then further extending the histogram by 50% on both sides so that it has $2^{n+1}$ bins and setting the new bins to zero. A set of n multi-resolution histograms is then formed by averaging groups of bins so that successive histograms have $2^2, 2^3, 2^4, \ldots 2^{n-1}, 2^n, 2^{n+1}$ bins and the location of peaks and valleys determined by convolving with a [1 -1] edge operator at every resolution and identifying changes of sign. Where the histogram is flat then the valley, if necessary, is right justified. The location of the peaks and valleys is then tracked through each resolution, the more resolutions in which it is located the higher the track length and the greater the perceived importance of the peak or valley. An example of this is shown in FIGS. 8(a)-8(f) in which the main (or most important) peak is not the highest.

This analysis enables pixels to be masked and excluded from the formation of the step 33 PCM used for segmenting the image into epithelial and background pixels. Very small isolated groups of pixels should not, however, be included in the mask. The identified pixels are therefore grouped and filtered using the same process as more fully described below with reference to step 36, with the following criteria for blobs. Only groups of pixels which meet these criteria are included within the mask.

| Criteria | Mask Accept if all criteria met: |
|---|---|
| X size | $\geq 3$ |
| Y size | $\geq 3$ |
| area | $\geq 9$ |
| aspect ratio | $\geq 0.25$ |
| density | $\geq 0.25$ |

Analysis of Distributions in PCM

Figure 9:
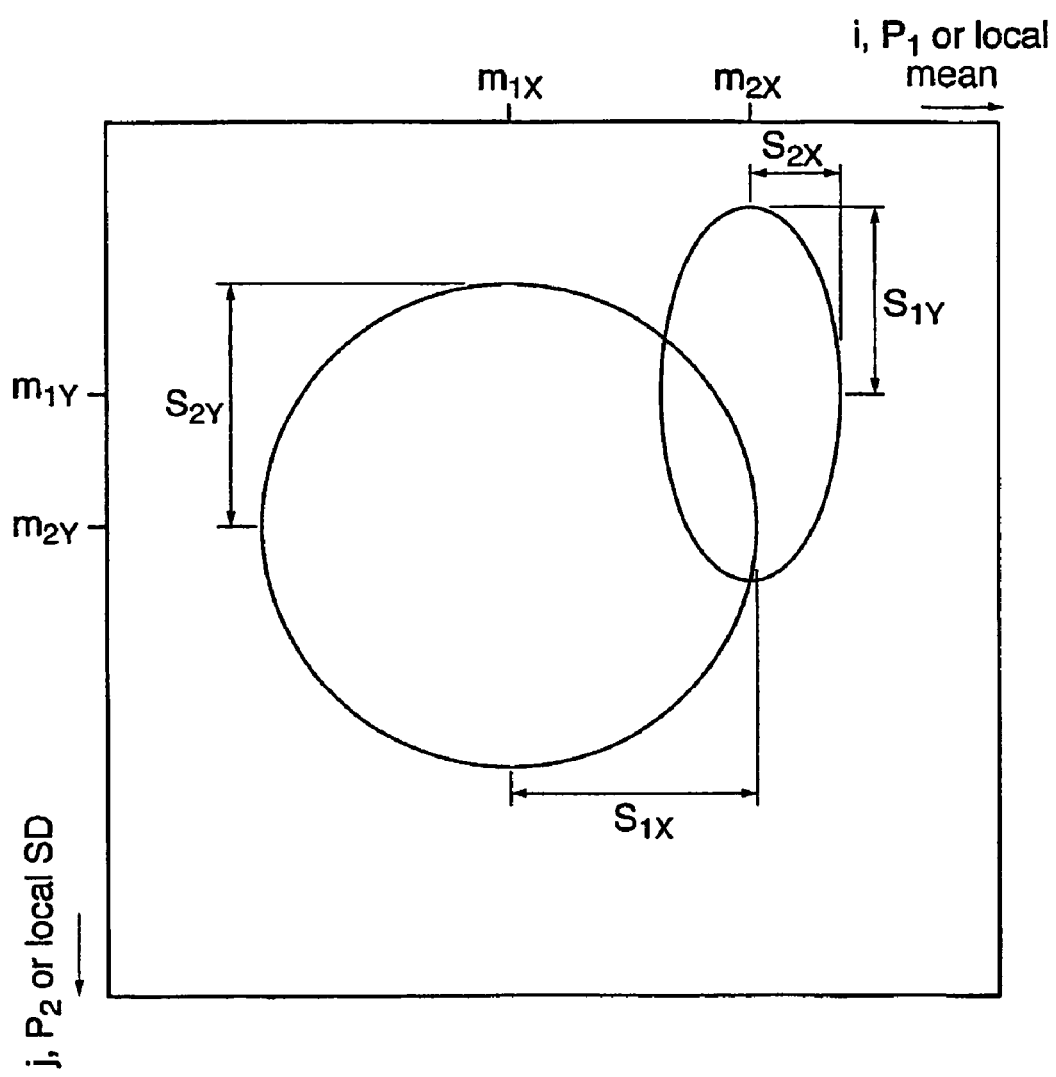
FIG. 9 shows a PCM and the location and parameters of two Gaussian distributions fitted using the EM algorithm; the radii of the distributions are drawn at two standard deviations.

The locations and extents of the two main 2-dimensional Gaussian distributions, and $N(m_{1x}, s_{1x}, m_{1y}, s_{1y})$ and $N(m_{2x}, s_{2x}, m_{2y}, s_{2y})$, within the PCM generated at step 33 must be determined. An example of such distributions is shown in FIG. 9. In the preferred embodiment this is achieved at step 34 using an implementation of the Expectation Maximisation (EM) algorithm described e.g. in Journal of Royal Statistical Society B,39: 1-38, 1977, 3 (*Maximum Likelihood from Incomplete Data via the EM Algorithm*, A P Dempster, N M Laird and D B Rubin). The standard EM algorithm enables a mixture of models with hidden parameters to be fitted to data using an iterative application of two steps which estimates new parameters for the mixture model and then maximises the fit. In brief:

| | |
|---|---|
| Initialisation: | Estimate initial mixture model parameters, for instance, the mean and standard deviation of the component Gaussian distributions. The initial model parameters can be determined/estimated in any appropriate manner. |
| Step 1: | Assume that the model parameters are correct, find the probability of each data point belonging to the given component of the mixture model, ie. to distribution 1 or 2. Re-estimate association probabilities between data components and model components. This leads to a 'weighted' data set that defines the mixture. |
| Step 2: | Re-estimate the model parameters and iterate from step 1 until convergence or other termination criteria, such as the error in the mixture model is less than some fraction. |

In the preferred embodiment, a variation on the standard algorithm is added to enable relative attributes of the two distributions to be forced. In this case the Gaussian amplitude of the model components is scaled by the product of their x and y standard deviations, ie. the models being fitted become $$\frac{N(m_{1x}, s_{1x}, m_{1y}, s_{1y})}{s_{1x}s_{1y}} \text{ and } \frac{N(m_{2x}, s_{2x}, m_{2y}, s_{2y})}{s_{2x}s_{2y}}.$$

Image Segmentation

At step 35 the image is segmented into three classes:

The background, which is generally light with a small local variance.

Epithelial cells, including those surrounding the ducts, which are generally darker with a larger local variance.

The mask pixels.

This is a hard segmentation assignment, T, which for the background and epithelial cells is based upon the address in the PCM to which a pixel's local properties contribute and the distance from this address to the nearest (normalised) distribution in the PCM (determined by the EM algorithm):

$$T(x) = \delta(1; M(x)) \underset{k=1,2}{k\delta} \left( \underset{k}{\min} \sqrt{\left(\frac{\underset{\Delta_m}{mean(I(x))} - m_{kx}}{R_k s_{kx}}\right)^2 + \left(\frac{\underset{\Delta_a}{sd(I(x))} - m_{ky}}{R_k s_{ky}}\right)^2}; \sqrt{\left(\frac{\underset{\Delta_m}{mean(I(x))} - m_{kx}}{R_k s_{kx}}\right)^2 + \left(\frac{\underset{\Delta_a}{sd(I(x))} - m_{ky}}{R_k s_{ky}}\right)^2} \right) \quad (12)$$

where $$\underset{\Delta_m}{mean(I(x))} \text{ and } \underset{\Delta_a}{sd(I(x))}$$

are the local mean and standard deviations over local neighbourhood $\Delta_m$ and $\Delta_\sigma$ respectively in image I indexed by vector x. $R_k$ is a scale factor to alter the relative importance of the two distributions, typically, $R_1=1$ and $R_2=0.8$.

Figures 10, 11:
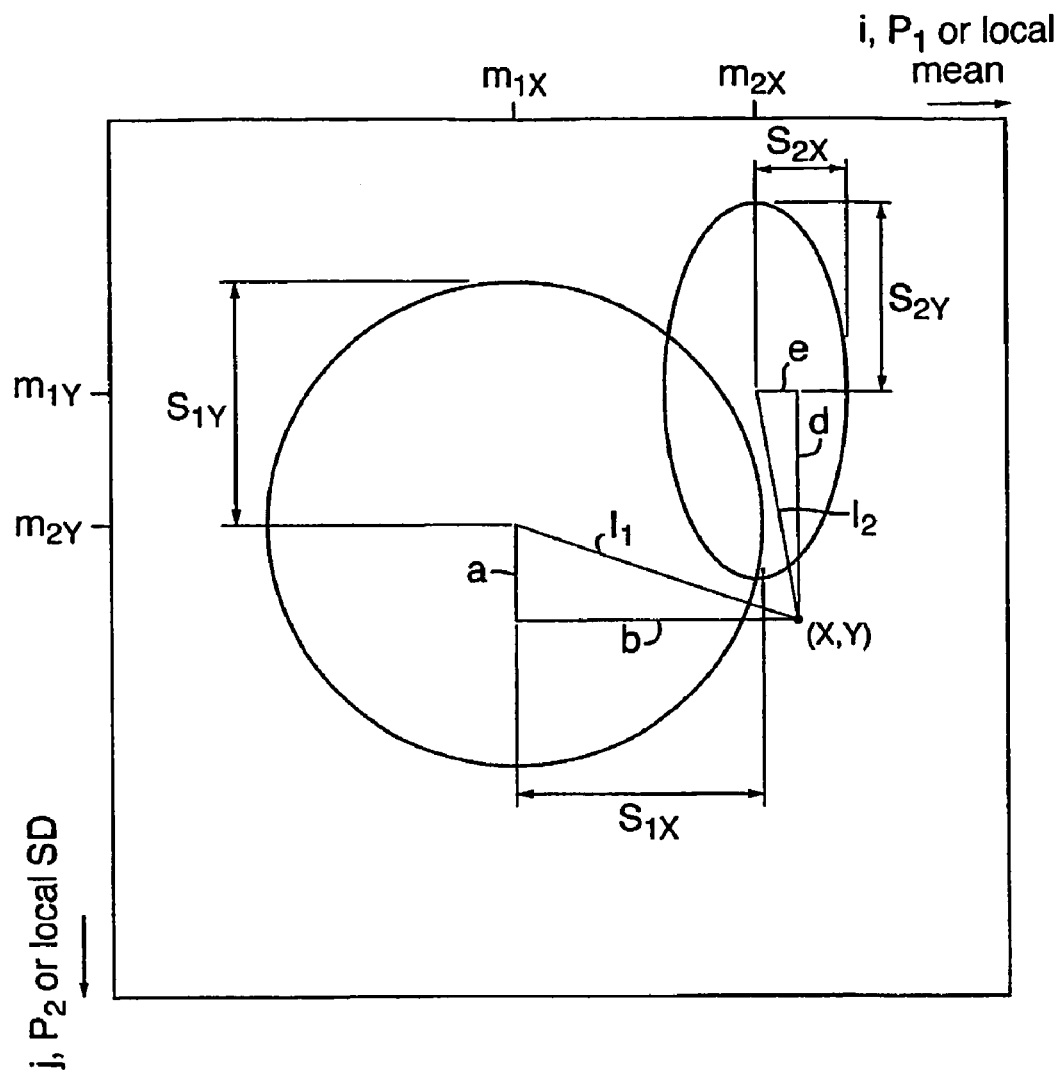
FIG. 10 shows how to calculate the distance from an address in the PCM to the fitted distributions so that the segmentation value of a pixel can be determined.
FIG. 11 shows the 8-pixels (a,b,c,d,e,f,g,h) which are neighbours of pixel X.

This may be clarified with reference to FIG. 10. The address of interest is (x,y) and the algorithm seeks to find which of the fitted distributions is closest: this corresponds to the minimum of $I_1$ and $I_2$. These distances can be determined from a, b, d and e normalised by the appropriate standard deviation and by the scaling factors $R_1$ and $R_2$.

This results in a segmentation, T, with pixels labelled as masked, epithelial or background with the following values:

$$T(x) = \begin{cases} 0 & \text{Masked pixel} \\ 1 & \text{epithelial cell} \\ 2 & \text{background} \end{cases} \quad (13)$$

Cleanup Image

At step 36 pixels in the segmentation which have been labelled as epithelial or background and which are adjacent to pixels of the same label using an 8-pixel neighbourhood (see FIG. 11) are grouped into blobs and filtered as follow.

The segmentation is cleaned to remove small holes (a blob labelled differently to its surroundings), small isolated blobs, lines and any other simple artefact. The measures used are X and Y sizes, area (in terms of numbers of pixels), density and aspect ratio of blobs. The values of these parameters will be related to the magnification and the size of epithelial cells. In the preferred embodiment with a magnification of ×10, the criteria for accepting a group of pixels can be varied if necessary, but typical minimum and maximum values are listed in the following table. If a blob is rejected then it is replaced by its surroundings.

| Criteria | Epithelial cell - hole Reject if any criteria met (ie. Merge as cell): | Epithelial cell - isolated group Accept if all criteria met |
|---|---|---|
| X size | ≦30 | ≧35, ≦10000 |
| Y size | ≦30 | ≧35, ≦10000 |
| area | ≦900 | ≧3000 |
| aspect ratio | ≦0.15 | ≧0.1 |
| density | ≦0.1 | ≧0.1 |

Density is defined as the number of pixels in a blob over the area of the minimum enclosing rectangle. The aspect ratio is the ratio of the minor to major axis of the blob.

Figure 12:
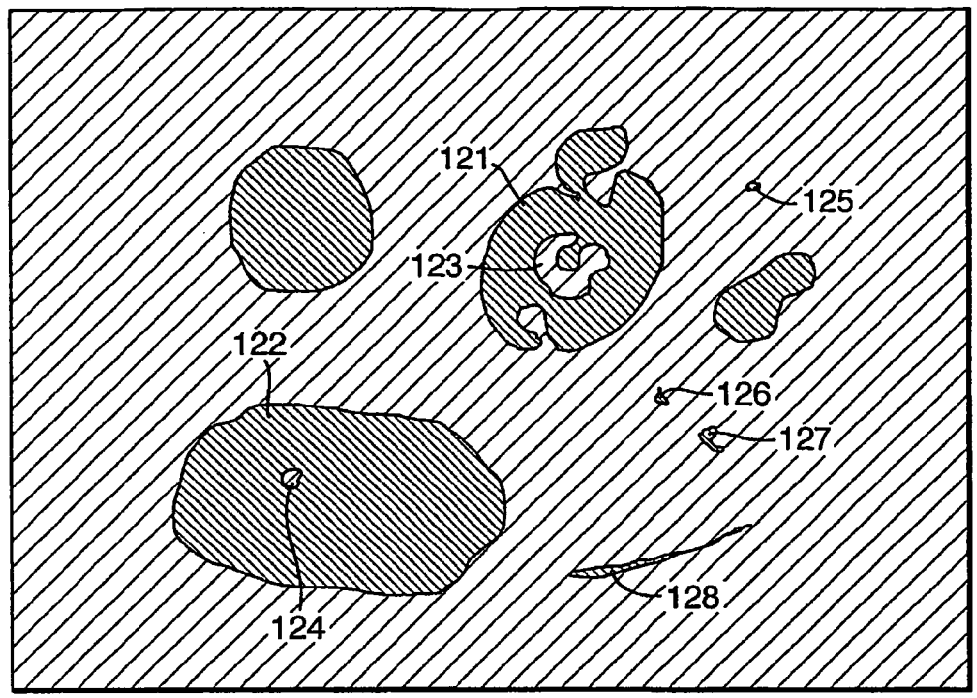
FIG. 12 shows several examples of blobs following image segmentation in the course of the preferred process.

By way of example, FIG. 12 shows epithelial (darker shading) and background (lighter shading) pixels grouped into blobs. Epithelial blobs 121 and 122 have holes comprising background blobs 123 and 124 respectively, of which the large hole 123 would be retained but the small hole 124 would be rejected and relabelled epithelial. The small epithelial blobs 125, 126 and 127 would be rejected on size while the long thin epithelial blob 128 would be rejected on aspect ratio, and all would be relabelled background.

Note that in this step 36 masked pixels (grouped and filtered at step 32) are ignored, so for example holes of any size in epithelial blobs due to the presence of ducts or fat cells (labelled masked at this stage) are retained, but for ease of illustration are not shown in FIG. 12.

Identify Duct Pixels

At step 37 groups of pixels or blobs which are labelled as masked but which satisfy simple shape and size criteria are relabelled as duct pixels. Typical values in the preferred embodiment would be:

| Criteria | Duct Accept if all criteria met: |
|---|---|
| X size | ≧3, ≦100 |
| Y size | ≧3, ≦100 |
| area | ≧9, ≦5000 |
| aspect ratio | ≧0.25 |
| density | ≧0.25 |

These values are not especially critical but have been chosen so that long tissue tears, shrinkage cracks and most fat cells are rejected.

At this stage, pixels are labelled as masked, epithelial, background or duct with values as follows:

$$T(x) = \begin{cases} 0 & \text{Masked pixel} \\ 1 & \text{epithelial cell} \\ 2 & \text{background} \\ 3 & \text{duct} \end{cases} \quad (14)$$

Dilating Tubule Seed Points

The purpose of step 38 is to dilate the blobs of duct pixels identified in step 37 into surrounding epithelial cell diameters by an amount equivalent to two typical epithelial cell diameters, so that the dilated duct blobs then equate to the presumed size of a corresponding tubule formation in the original tissue sample.

Duct cells should be surrounded by epithelial cells. Due to the way in which the slide is prepared this may not always be the case with ducts occasionally partially surrounded by background cells. Any blob which has been labelled as duct but whose boundary does not have sufficient neighbouring epithelial cells will be reclassified as mask, not duct. In the preferred implementation, at least 15% of the boundary must be with epithelial cells, determined by counting the bounding pixels.

Furthermore, there may be a very small gap between pixels labelled duct and those labelled epithelial. This is due to the neighbourhood used in the segmentation. The larger the neighbourhood, the larger this gap can be. In the preferred implementation, the dilation is allowed to cross a gap of, say, two pixels by repeatedly applying the following dilation technique until the overall dilation is equivalent to two epithelial cell diameters.

There are a variety of methods that could be used for dilation, most notably that of morphology. However, in the preferred embodiment the image, I, is convolved with a 2 dimensional Gaussian kernel, $N(0,s)$, to generate a new dilated image, D. The Gaussian kernel has a zero mean and a standard deviation s such that the Gaussian has a value 1 at a radius 1 greater that the gap to be bridged. In more detail consider the following algorithm:

1. A new image, D, is created in which all pixels in the segmentation which are to be subject to dilation are set to 1 and all other pixels are set to 0.
2. Image D is convolved with a Gaussian kernel that has a standard deviation such that the value of the Gaussian is 1 at the desired amount of dilation, ie. if the maximum gap to be crossed is 2 pixels then the desired amount of dilation is 3 pixels and the value of the Gaussian kernel at 3 pixels from the centre would be 1. The results of the convolution are rounded down, ie. to values 0 or 1.
3. All pixels which are 1 in the dilated image and are of the class to be dilated into in the original image are set to the dilated class, otherwise they are left as they are. This means that blobs of pixels labelled duct can be dilated into blobs labelled epithelial across a gap of another label. The maximum gap that can be crossed is 1 less than the amount of dilation.

Repeated application of this algorithm enables duct blobs to be dilated across minor artefacts into epithelial blobs without uncontrolled behaviour.

A single step of the dilation is defined by $$D(x) = \delta(T(x); \text{duct}) \qquad (15)$$

$$D_1(x) = \delta(int(D(x) \otimes N(0, s)); \delta(T(x); \text{duct or epithelial})$$

$$D_n(x) = \delta(int(D_{n-1}(x) \otimes N(0, s)); \delta(T(x); \text{duct or epithelial})$$

$$D(x) \leftarrow D_n(x)$$

where $\otimes$ is the operator for digital convolution. Initially, the image to be dilated, $D(x)$, contains all pixels which have been labelled as duct. This is then convolved with the 2-dimensional Gaussian Kernel of appropriate extent and the results converted to integer by truncation. Pixels that are now labelled duct and were previously labelled as either duct or epithelial are retained as duct, all other pixels are set to 0. This process is repeated until the desired level of dilation is achieved, equivalent to two typical epithelial cells, which, in the preferred embodiment, will be 13 iterations.

Figure 13A:
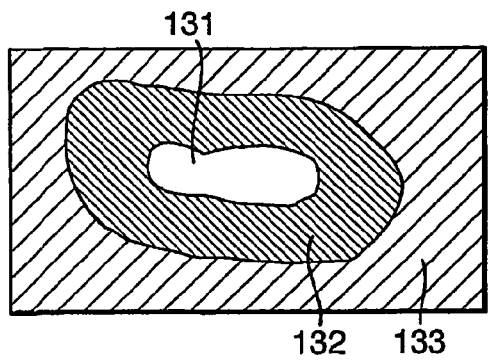
FIGS. 13(*a*) and 13(*b*) are visualisations of the results of dilation in the course of the preferred process.
Figure 13B:
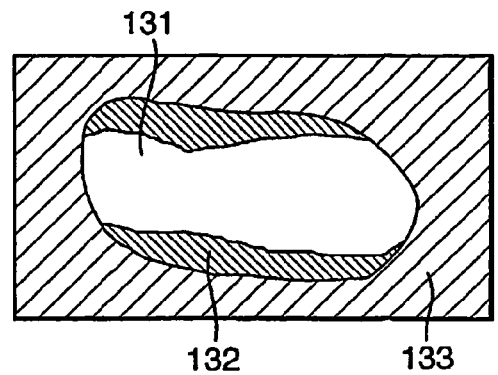

A visualisation of the result of this dilation is shown in FIG. 13. In FIG. 13(a), prior to dilation, there is a duct blob 131 within an epithelial blob 132 and adjacent background blobs 133. Blob 132 represents a mass of epithelial cells in the original slide which extends in some directions beyond the tubule formation containing the duct represented by blob 131. FIG. 13(b) shows the same after dilation, which has been stopped in some directions by the outer boundary of the original epithelial blob.

Assessing Severity of Cancer

In step 39 the metric M on which the severity of cancer will be based is calculated as the ratio of the number of dilated pixels labelled duct to the total of the duct and epithelial pixels:

$$M = \frac{\sum_x \delta(D(x); \text{duct})}{\sum_x \delta(T(x); \text{duct}) + \sum_x \delta(T(x); \text{epithelial})} \qquad (16)$$

It will be seen that this effectively corresponds to the metric given in equation (1) as used by histopathologists when grading slides by eye.

As previously indicated, clinicians typically use decision boundaries of 10% and 75% to grade cancer severity based on this metric. This is not, however, necessarily appropriate for an automatic system in step 40 because:

The human visual system under perceives on the extremities, ie. a true 75% will tend to be perceived as being higher while a true 10% will tend to be perceived as being lower.

The pixels that are counted in the automated system may not necessarily be identical to those that would be included by a human observer. However, the decision as to whether a pixel is excluded or included in an automated system is more consistent than for a human observer.

For these reasons the actual decision boundaries to be used are preferably defined by training in step 41. Thresholds can thus be selected on metric M to define the boundaries between grade 1 and 2, and between grades 2 and 3. These thresholds should be based upon representative and complete training data. This may well mean on a per laboratory basis.

The invention claimed is:

1. A method for the automated analysis of a digital image comprising an array of pixels, including the steps of using a computer or processor for:

identifying certain pixels to exclude from the following step, consequent upon a local property of such pixels;

generating a property co-occurrence matrix (PCM) from pixels not identified to be excluded by the preceding step, using the properties of local mean and local standard deviation of intensity in neighbourhoods of the included pixels; and segmenting the image by labelling the pixels which are included in the formation of said PCM as belonging to specified classes consequent upon analysis of said PCM and by labeling pixels which are excluded from the formation of said PCM as belonging to a specified class different from the first-mentioned classes.

2. A method according to claim 1 wherein respective Gaussian distributions are fitted to the two main distributions within the PCM using an implementation of the Expectation Maximisation (EM) algorithm to determine the distribution parameters.

3. A method according to claim 1 wherein pixels are labelled in accordance with a distribution within the PCM to which they are closest and including the steps of:
  assigning a respective label to separate distributions within the PCM;
  determining the normalised distance between the point within the PCM to which the respective pixel contributes and the centre of each labelled distribution; and
  assigning to the respective pixel the label of the distribution for which such normalised distance is the shortest.

4. A method according to claim 1 wherein the step of identifying pixels to exclude from the formation of said PCM comprises:
  forming a grey level histogram from some or all of the image pixels;
  establishing a threshold consequent upon analysis of said histogram; and
  excluding from the formation of said PCM those pixels which are above said threshold.

5. A method according to claim 1 wherein the step of identifying pixels to exclude from the formation of said PCM comprises:
  generating a property co-occurrence matrix (PCM) from the image pixels, using the properties of local mean and local standard deviation of intensity in neighbourhoods of the respective pixels and having a higher resolution than the first-mentioned PCM;
  forming a histogram of the local mean by summing along constant local mean for a small range of local standard deviation;
  establishing a threshold consequent upon analysis of said histogram; and
  excluding from the formation of the first-mentioned PCM those pixels which are above said threshold.

6. A method according to claim 1 further comprising the steps of grouping into blobs contiguous pixels labelled as belonging to the same one of any said class, calculating statistics concerning respective said blobs and filtering the same in accordance with said statistics.

7. A method according to claim 6 wherein said filtering comprises relabelling the pixels in selected blobs as belonging to a new class different from any aforesaid class.

8. A method according to claim 7 further comprising the step of dilating by a specified amount blobs composed of pixels relabelled as belonging to said new class (Cn) into adjacent blobs composed of pixels labelled as belonging to a selected one of the first-mentioned specified classes (Co).

9. A method according to claim 8 wherein said dilation comprises the steps of:
  creating a new image by assigning pixels of class Cn in the original image to a value of 1 in the new image and assigning all other pixels to 0;
  convolving the new image with a two-dimensional Gaussian kernel having a zero mean and a standard deviation set equal to said specified amount and such that the value of the Gaussian is 1 at 1 standard deviation from the mean;
  truncating the resultant image so that it contains only the values 1 and 0; and
  if a pixel has a value of 1 in the truncated image and is labelled as either class Cn or class Co in the original image, assigning it to class Cn in the original image.

10. A method according to claim 8 wherein said dilation comprises repeatedly performing the steps of:
  creating a new image by assigning pixels of class Cn in the original image to a value of 1 in the new image and assigning all other pixels to 0;
  convolving the new image with a two-dimensional Gaussian kernal having a zero mean and a standard deviation set to a predetermined value (L) and such that the value of the Gaussian is 1 at 1 standard deviation from the mean;
  truncating the resultant image so that it contains only the values 1 and 0; and
  if a pixel has a value of 1 in the truncated image and is labelled as either class Cn or class Co in the original image, assigning it to class Cn in the original image;
  whereby said specified amount of dilation is achieved notwithstanding the presence of gaps of not more than L−1 pixels labelled as belonging to a class neither Co nor Cn between said blobs composed of pixels labelled as belonging to class Cn and said blobs composed of pixels labelled as belonging to class Co.

11. A method according to claim 8 further comprising the step of calculating a metric being the ratio of the number of pixels labelled as class Cn after said dilation to the sum of the number of pixels labelled as class Cn and the number of pixels labelled as class Co.

12. A method according to claim 1 for the automated analysis of a digital image of a section of breast tissue or other histological or cytology specimen.

13. A method according to claim 12 wherein a result of said segmentation is to label selected pixels as belonging to the class of epithelial cells.

14. A method according to claim 7 wherein said image is an image of a section of breast tissue or other histological or cytology specimen and wherein said new class is identified as the class of duct cells.

15. A method according to claim 8 wherein said image is an image of a section of breast tissue or other histological or cytology specimen and wherein class Cn is identified as the class of duct cells and class Co is identified as the class of epithelial cells.

16. A method according to claim 15 wherein said dilation is over a distance corresponding to a specified number of epithelial cells.

17. A method for the automated analysis of a digital image of a physical specimen comprising an array of pixels, comprising the steps of using a computer or processor for:
  segmenting the image by labelling respective pixels as belonging to one of two or more classes;
  grouping contiguous pixels of the same class into blobs;
  calculating statistics concerning respective said blobs;
  relabelling the pixels in selected said blobs as belonging to a different said class;
  dilating selected blobs of one said class into blobs of another said class by a specified amount;
  calculating a metric which relates the total area covered by the dilated blobs to the total area covered by blobs of a selected class or classes; and
  providing an indication of the condition of said specimen on the basis of said metric.

18. A method for the automated analysis of a digital image of a histological specimen of breast tissue comprising an array of pixels, comprising the steps of using a computer or processor for:

labelling pixels as representing epithelial cells and duct cells respectively;

dilating groups of pixels labelled as representing duct cells into adjacent groups of pixels labelled as representing epithelial cells by a specified amount related to the size of an epithelial cell;

calculating the total number of pixels labelled as representing duct cells after such dilation and the total number of pixels labelled as representing duct cells or epithelial cells;

calculating a metric from the calculations in the preceding step; and providing an indication of a grade of cancer on the basis of said metric.

19. A computer program located on a tangible computer readable medium including instructions to cause a computer or processor to execute a method for the automated analysis of a digital image comprising an array of pixels comprising the steps of:

identifying certain pixels to exclude from the following step, consequent upon a local property of such pixels;

generating a property co-occurrence matrix (PCM) from pixels not identified to be excluded by the preceding step, using the properties of local mean and local standard deviation of intensity in neighbourhoods of the included pixels; and segmenting the image by labelling the pixels which are included in the formation of said PCM as belonging to specified classes consequent upon analysis of said PCM and by labeling pixels which are excluded from the formation of said PCM as belonging to a specified class different from the first-mentioned classes.

* * * * *